US006079916A

United States Patent [19]

Grayson et al.

[11] Patent Number: 6,079,916

[45] Date of Patent: Jun. 27, 2000

[54] ROTARY POWER TOOL WITH REMOTELY ACTUATED CHUCK

[75] Inventors: Jeremy Grayson, Columbia; Keith Buddendeck, Clemson; Ronald W. Miksa, Central, all of S.C.

[73] Assignee: Power Tool Holders, Inc., Christiana, Del.

[21] Appl. No.: 09/196,580

[22] Filed: Nov. 20, 1998

[51] Int. Cl.[7] ................................ B23C 1/20; B23B 5/22

[52] U.S. Cl. ................................ 409/182; 279/43; 279/50

[58] Field of Search ................................ 409/182; 279/42, 279/43, 48, 50, 56, 57, 62, 74, 75, 76, 83, 902; 408/240, 241

[56] References Cited

U.S. PATENT DOCUMENTS

| | | | |
|---|---|---|---|
| 425,224 | 4/1890 | Hartness . | |
| 460,922 | 10/1891 | Minnich | 279/42 |
| 658,473 | 9/1900 | Smith et al. . | |
| 709,014 | 9/1902 | Jacobs | 279/62 |
| 2,354,966 | 8/1944 | Panza et al. . | |
| 2,370,729 | 9/1945 | Hoppe . | |
| 2,466,651 | 4/1949 | Zagar . | |
| 2,562,143 | 7/1951 | Godfrey et al. | 409/182 |
| 2,655,826 | 10/1953 | Goldsby . | |
| 2,910,302 | 10/1959 | Ondeck | 279/902 |
| 3,095,205 | 6/1963 | Farnsworth . | |
| 3,724,563 | 4/1973 | Wickham et al. . | |
| 3,811,361 | 5/1974 | Seely et al. . | |
| 4,386,879 | 6/1983 | Martinmaas | 279/62 |
| 4,389,146 | 6/1983 | Coder | 279/62 |
| 4,400,995 | 8/1983 | Palm | 408/241 |
| 5,188,492 | 2/1993 | McCracken . | |
| 5,613,693 | 3/1997 | Ramunas | 279/76 |
| 5,743,539 | 4/1998 | Vanderpool et al. . | |
| 5,755,448 | 5/1998 | Kanaan et al. | 279/75 |
| 5,876,158 | 3/1999 | Beiter | 279/83 |

OTHER PUBLICATIONS

U.S. Patent Application entitled "Electronic Lever for Remotely Actuating A Chuck Device," USSN 09/196,795, Filed Nov. 20, 1998.

U.S. Patent Application entitled "Rotary Power Tool With Hydraulically Actuated Chuck," USSN 09/197,261, Filed Nov. 20, 1998.

U.S. Patent Application entitled "Horizontal Lever Actuated Chuck," USSN 09/197,260, Filed Nov. 20, 1998.

U.S. Patent Application entitled "Rotary Power Tool with Remotley Actuated Chuck," USSN 09/067, 629, Filed Apr. 28, 1998.

*Primary Examiner*—Andrea L. Pitts
*Assistant Examiner*—Erica Ergenbright
*Attorney, Agent, or Firm*—Nelson Mullins Riley & Scarborough, L.L.P.

[57] ABSTRACT

A rotary power tool incorporates a remotely actuated chuck device. An engagement surface, such as a threaded or helical surface, is defined on an outer circumference of the chuck device over an axial length thereof. An actuator member is disposed concentric and rotatable relative to the engagement surface. In an actuation mode, the actuation member is brought into engagement with the engagement surface so that rotation of the actuator member drives the chuck device axially between gripping and release positions.

20 Claims, 5 Drawing Sheets

ROTARY POWER TOOL WITH REMOTELY ACTUATED CHUCK

BACKGROUND OF THE INVENTION

The present invention relates to a rotary power tool, particularly a router, having a chuck device for holding a tool bit to a drive spindle wherein the chuck device is remotely actuated.

There are a number of well known types of power tools, including routers, wherein a chuck is mounted on the end of a rotatable drive spindle for holding a tool bit to the drive spindle. In many applications of these tools, it is necessary to manually manipulate or engage the chuck in order to change out the tool bit. A number of chuck devices utilize an axially movable outer sleeve member to actuate the chuck. For example, many such chuck devices have an axially movable outer sleeve that moves between a gripping position wherein the chuck grips upon a tool shank inserted into the chuck, and a release position wherein the chuck releases the tool shank inserted therein. Such chuck devices are commonly referred to as "quick-change" chucks. For example, one such chuck is illustrated and described in U.S. Pat. No. 5,810,366. Additional examples of such chucks are illustrated in U.S. Pat. Nos. 4,692,073; 2,807,473 and 3,521,895. U.S. patent application Ser. No. 09/067,569 describes another type of sleeve actuated chuck.

In certain operating environments, particularly with high speed routers, there is limited space in the critical area of the chuck device and tool bit to actuate the chuck for removal or insertion of the tool bit and the operation of changing out the tool bits can be potentially dangerous. With many conventional tools, the chucks are actuated by an external mechanism, such as a wrench or other tool. There is, however, a trend in the industry to incorporate quick-change chucks with such tools, particularly routers, to eliminate the necessity of external tools for operating the chucks and to take advantage of the obvious benefits of the quick-change chucks. However, the operation of actuating these quick-change chucks may also be cumbersome and potentially dangerous, especially where the operator must insert his hands next to the cutting edges of the tool bit.

The present invention provides an apparatus for remotely actuating a quick-change chuck device on rotary power tools, particularly routers, in a safe and quick manner.

OBJECTS AND SUMMARY OF THE INVENTION

It is therefore a principal object of the present invention to provide a power rotary tool that incorporates a mechanism for remotely actuating a chuck, in particular a quick-change chuck, for any manner of power tool.

An additional object of the present invention is to provide a mechanism for safely changing out tool bits in rotary power tools wherein the operator's hands are totally removed from the cutting area of the tool bit.

And still a further object of the present invention is to provide a mechanism for remotely actuating chucks on rotary power tools so that actuation of the chuck is no longer limited by manual hand strength.

Still a further object of the present invention is to provide a actuation mechanism for quick-change chucks that is particularly suited for high speed routers.

Additional objects and advantages of the invention will be set forth in part in the following description, or may be obvious from the description, or may be learned through practice of the invention.

In accordance with the objects and purposes of the invention, a rotary power tool is provided having a remotely actuated chuck device mounted on the end of a rotatable drive spindle. The rotary power tool will be described herein as a router. However, it should be appreciated that the present invention is not limited to any particular rotary power tool, and has application wherever it may be desired to remotely actuate a quick-change type of chuck, for example with power drills, drill presses, lathes, milling machines, sanders, grinders, and the like.

It should also be appreciated that the present invention is not limited to any particular type of chuck device and, in this regard, the internal working mechanism of the chuck device is not particularly important to the invention or necessary for an understanding of the invention. It is intended that the present invention be utilized with any manner of chuck device that is actuated between a gripping and release position by axial movement of a member of the chuck device, such as an outer sleeve member.

The power tool according to the invention includes a casing that houses a drive spindle with an end of the spindle extending through the casing and coupled with the chuck device. In a preferred embodiment of the invention, the chuck device includes an outer sleeve member that is axially movable relative to the body member of the chuck between a gripping position wherein the chuck device clamps upon a tool bit held within the chuck, and a release position wherein the chuck device releases the tool bit.

An engagement surface is defined on an outer circumference of the chuck device over an axial length thereof corresponding generally to the amount of axial movement of the chuck between the gripping and release positions. This engagement surface can take on any form, and preferably is a grooved surface, such as a threaded surface or a helical groove.

The rotary power tool includes an actuator member that is disposed around and rotatable relative to the engagement surface of the chuck device. In a preferred embodiment of the invention, this actuator member is a rotatable ring member. In a disengaged mode, the actuator member is not in driving engagement with the chuck device engagement surface and rotation of the actuator member will not cause axial movement of the chuck device. In an engaged or actuation mode, the actuator member is operably engaged with the engagement surface, for example through an intermediate member, such that rotation of the actuator member drives the chuck device axially between the gripping and release positions.

The actuator member further includes an engagement member, such as a pin member, that is movable into driving engagement with the engagement surface defined on the chuck device. In the non-engaged or non-actuation mode, this engagement member is moved out of engagement with the engagement surface of the chuck device. In one preferred embodiment, the engagement member comprises a pin extending essentially through the actuator member or ring so as to extend into a grooved or threaded surface defining the chuck device engagement surface. The pin is manually movable so as to move out of engagement with the chuck device in a relatively simple manual operation.

In one preferred embodiment, the actuator member is a manually rotatable ring member wherein the operator merely grasps the ring, moves the engagement member into engagement with the chuck device engagement surface, and manually rotates the ring in order to drive the chuck axially between the gripping and release positions.

In still another preferred embodiment, a further drive mechanism is operably configured with the actuator member to rotate the actuator member or ring in the actuation mode. For example, this drive mechanism may comprise a manually rotatable handle member or drive mechanism that is geared or otherwise operably rotationally coupled to the actuator member. A gear mechanism may be disposed between the handle or drive member and the actuator member. The handle or drive member thus provides a means for rotating the actuator member that is even further removed from the chuck device and easily accessible for simple manual operation. For example, the handle member may extend longitudinally along the housing or casing of the power tool or may reside within the inner circumference of the base member, for example on the upper surface of the casing.

The engagement surface may be defined on the chuck device in any conventional manner. For example, the engagement surface may be defined directly on the chuck outer surface, or may be defined on a ring or sleeve that is separately press-fitted or otherwise attached to the chuck. Any and all such configurations of an engagement surface are within the scope and spirit of the invention.

In a particularly useful embodiment of the invention, the rotary power tool is a router and includes a base member that is movable relative to the casing and the chuck device for establishing a working position of the chuck device relative to a work piece. The operation of such conventional routers and base members is well understood by those skilled in the art. The present invention is particularly useful with a conventional fixed-base router wherein the base member is rotatably advanceable on the casing for changing the working position. The actuator member is rotatably mounted on the casing generally within the inner circumference of the base member so as not to interfere with rotational movement of the base member relative to the casing.

The remote actuating mechanism according to the invention may be incorporated as a component of the power tool casing, or may be an after-market retrofit item that can be easily installed on existing rotary power tools, particularly routers.

The preferred embodiments of the present invention will now be discussed in detail with the reference to the following figures. dr

DETAILED DESCRIPTION

Figure 1:
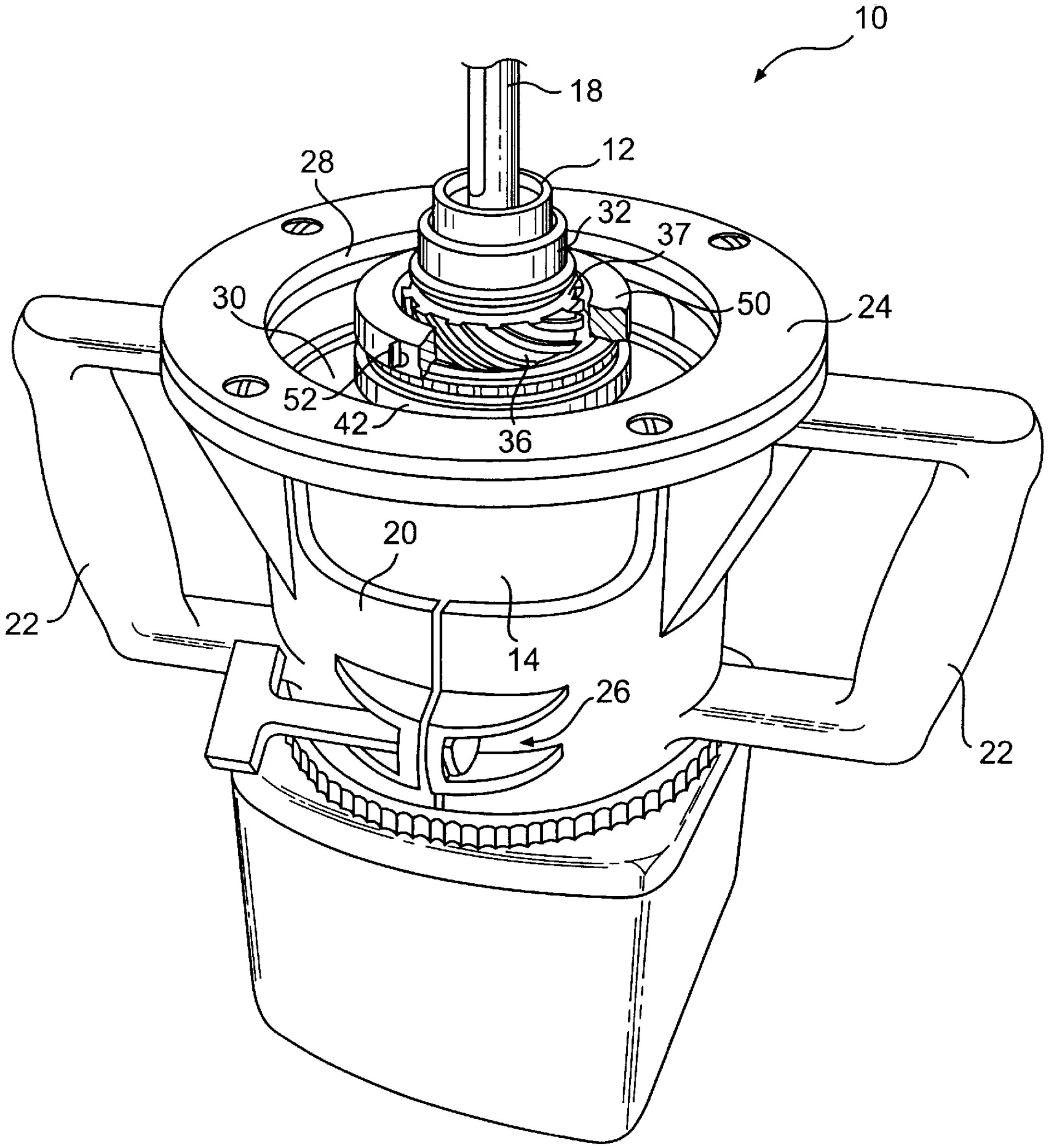
FIG. 1 is a perspective view of a power tool, particularly a router, according to the present invention.

Reference will now be made in detail to the presently preferred embodiments of the invention, one or more examples of which are illustrated in the drawings. Each example is provided by way of explanation of the invention, and not meant as a limitation of the invention. For example, features illustrated or described as part of one embodiment can be used on another embodiment to yield still a third embodiment. It is intended that the present invention include such modifications and variations as come within the scope and spirit of the present invention.

The present invention relates to power tools in general. For example, referring to the figures, power tool 10 is illustrated as a conventional router. The particularly illustrated router is conventionally known as a "fixed-base" router wherein a base member 20 is axially movable or positionable by rotating the base member relative to a motor casing 14. This type of router is well known to those skilled in the art. Additional routers that are just as applicable (but not illustrated) include plunge style routers wherein the base moves axially along plunge rods or arms. This type of router is also well known to those skilled in the art.

It should be appreciated that the present invention is not limited to any particular type of power tool, particularly any type of router. The invention has distinct advantages as it pertains to a fixed base router, as will be described in greater detail below, but this is not meant as a limitation of the invention. The present invention relates to any manner of power tool wherein it is desired to remotely actuate a chuck between gripping and release positions, including power drills, drill presses, lathes, milling machines, sanders, and the like.

The rotary power tool 10 according to the invention includes a chuck device, generally 12, for holding a tool 18. For example, in the embodiment of the power tool illustrated in the figures, chuck 12 holds a router bit 18. It should be appreciated that the type of chuck 12 is not particularly important to the invention. The present invention applies to any manner of chuck, for example the chucks described and illustrated in the patents and applications discussed above, wherein a chuck 12 is actuated through axial movement relative to a body member or drive spindle of the power tool. For example, chuck 12 may be actuated by axial movement of an outer sleeve 32 relative to a drive spindle. There are a number of sleeve actuated chuck devices known to those skilled in the art and the particular operation of chuck 12 is not necessary for an appreciation or understanding of the present invention. Chuck 12 will not be described in detail herein. One particular type of chuck for which the present invention is particularly applicable is illustrated and described in U.S. Pat. No. 5,810,366 and U.S. patent application Ser. No. 09/067,569, the entire disclosures of which are incorporated herein by reference in their entirety for all purposes.

The chuck illustrated in the present figures is similar to the chuck illustrated and described in pending application Ser. No. 09/067,569. With this particular type of chuck, an axial bore is defined by a plurality of longitudinally extending gripping segments separated by axially extending slits. An axially movable sleeve member surrounds the gripping segments. The gripping segments are compressed radially inward upon axial movement of the sleeve member to a gripping position to grip upon a tool shank inserted into the bore. The tool is released when the gripping segment is moved to a release position upon opposite axial movement of the sleeve. Referring again to the figures in general, rotary power tool 10 includes a casing 14 that houses a rotationally driven drive spindle. Casing 14 is also the housing member for the drive spindle motor (not illustrated).

The router embodiment of power tool 10 illustrated in the figures is a fixed-base router and base 20 is axially advanceable relative to casing 14 by rotating base 20 relative to the casing. Upon rotation of base 20, working surface 24 is axially positioned to establish a working position of tool 18 held by chuck device 12 relative to a work piece. The operation of the base member is conventional and known to those skilled in the art. In general, an operator releases locking device 26 of base member 20 and adjusts the base member by rotating handles 22 causing base member 20 to move axially relative to casing 14.

Rotary power tool 10 according to the invention includes an engagement surface, generally 36 defined on an outer circumferential surface of chuck device 12. This engagement surface 36 has a defined axial length that determines the degree of axial movement of outer sleeve 32. In the embodiment illustrated in FIGS. 1 and 2, engagement surface 36 is defined by adjacent helical grooves 40 running the axial length of surface 36. In an alternative embodiment illustrated in FIG. 3, engagement surface 36 is defined by a threaded surface 38 defined on outer sleeve 32 of chuck 12. Engagement surface 36 may be defined on chuck 12 in any conventional manner. For example, engagement surface 36 may be defined on a sleeve 37 that is press-fitted or otherwise attached onto chuck 12. In an alternative embodiment, engagement surface 36 may be manufactured directly into the outer circumferential surface of chuck 12. Any and all such methods and devices for defining the engagement surface are within the scope and spirit of the invention.

An actuator member is disposed concentric and rotatable relative to engagement surface 36. In a preferred embodiment, this actuator member comprises a ring member 50 disposed concentric to surface 36. Ring member 50 is rotationally mounted on the power tool 10. One preferred means for rotationally mounting ring member 50 is illustrated particularly in FIG. 2. A conventional bearing assembly 44 is mounted on a bearing track 42. Bearing track 42 is attached to upper surface 30 of casing 14 by any conventional means, for example machine screws 48. Ring member 50 is press-fitted or otherwise attached to one race of bearing assembly 44, while the other race is rotationally held in bearing track 42. Any manner of conventional bearing arrangements may be utilized in this regard to allow ring member 50 to rotate relative to engagement surface 36.

Figure 2:
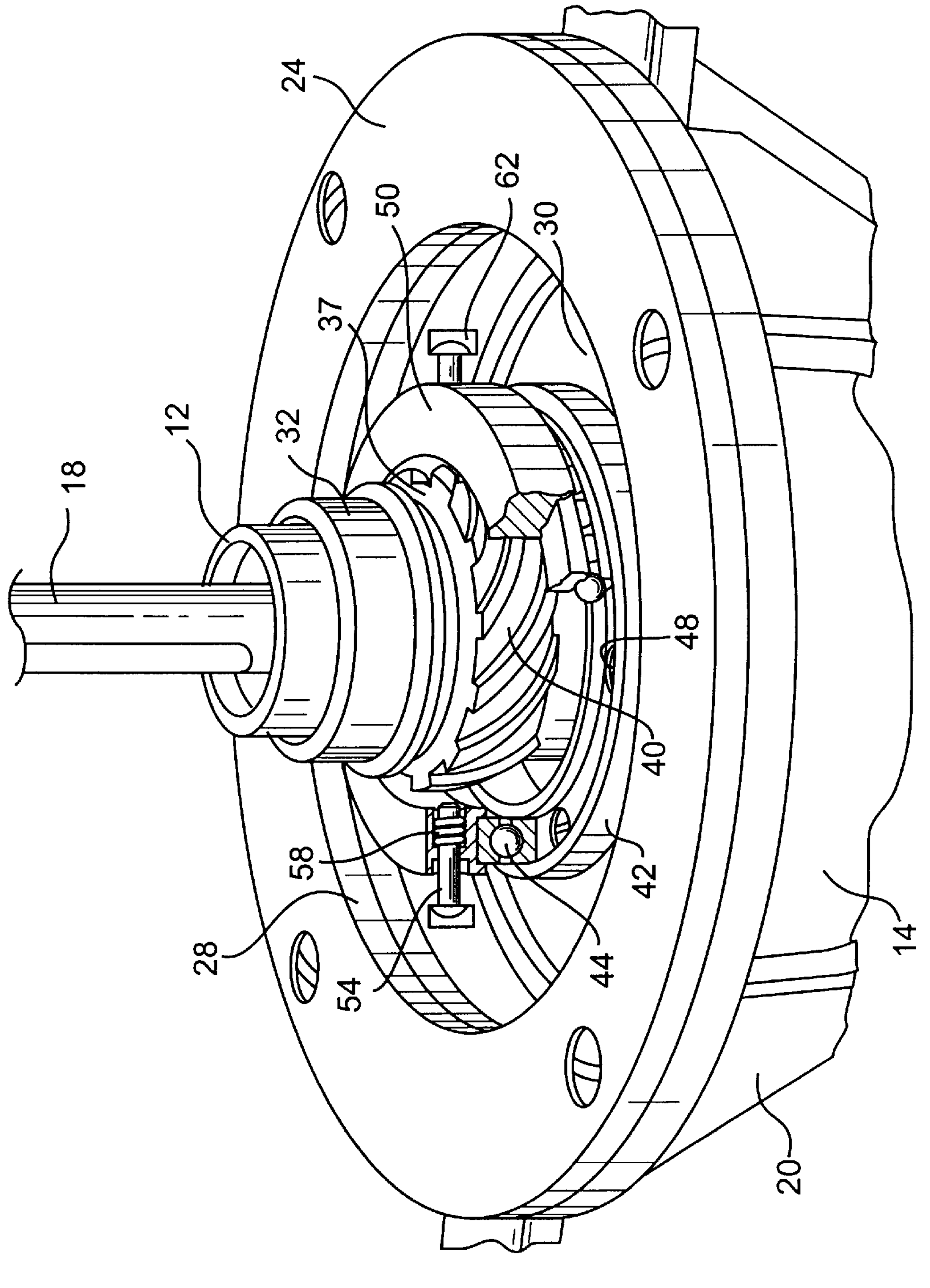
FIG. 2 is an enlarged partial cut-away view of the remote chuck actuation device according to the invention.
Figure 3:
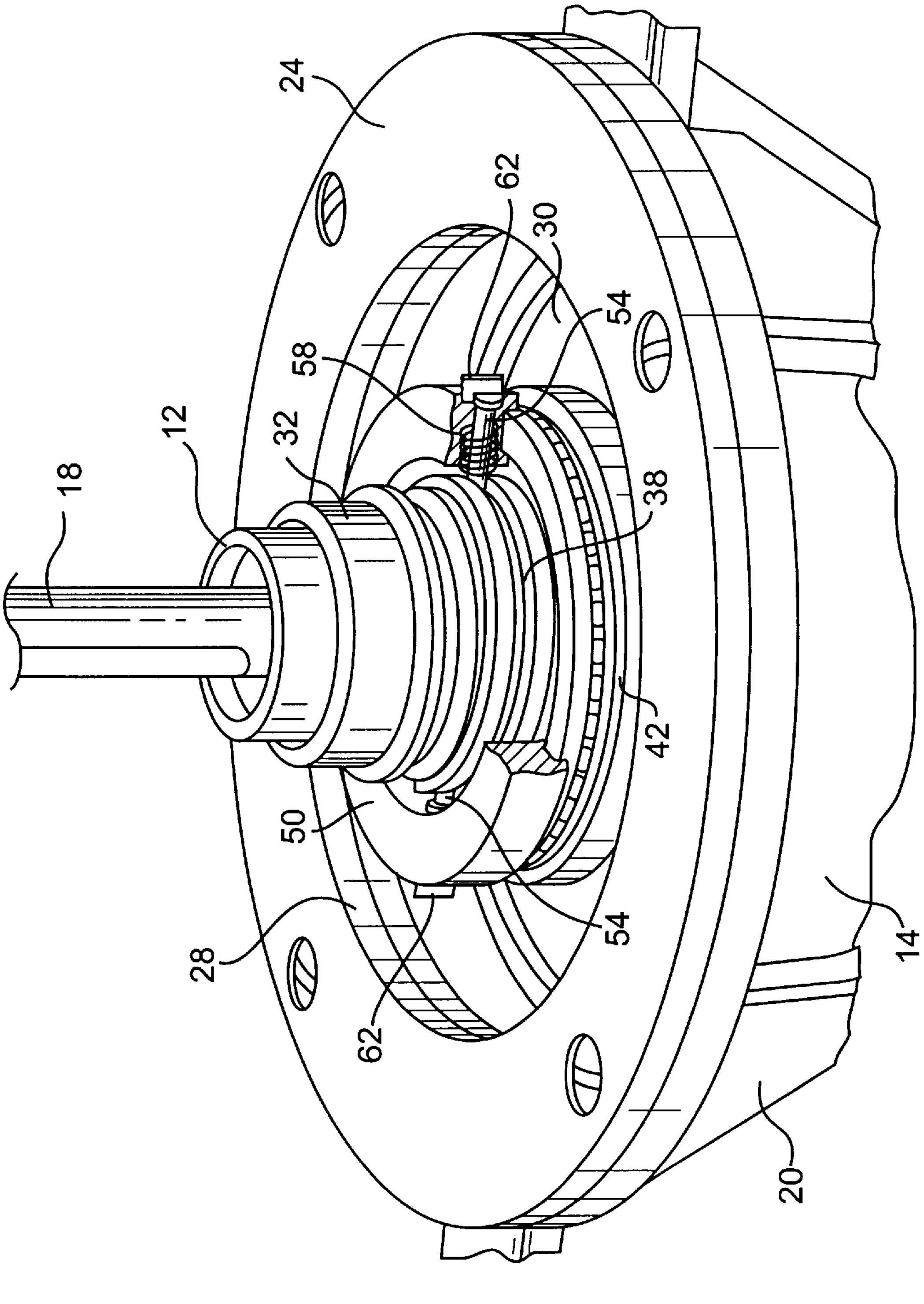
FIG. 3 is an enlarged partial cut-away view of an alternative embodiment of the remote chuck actuation device according to the invention.
Figure 5:
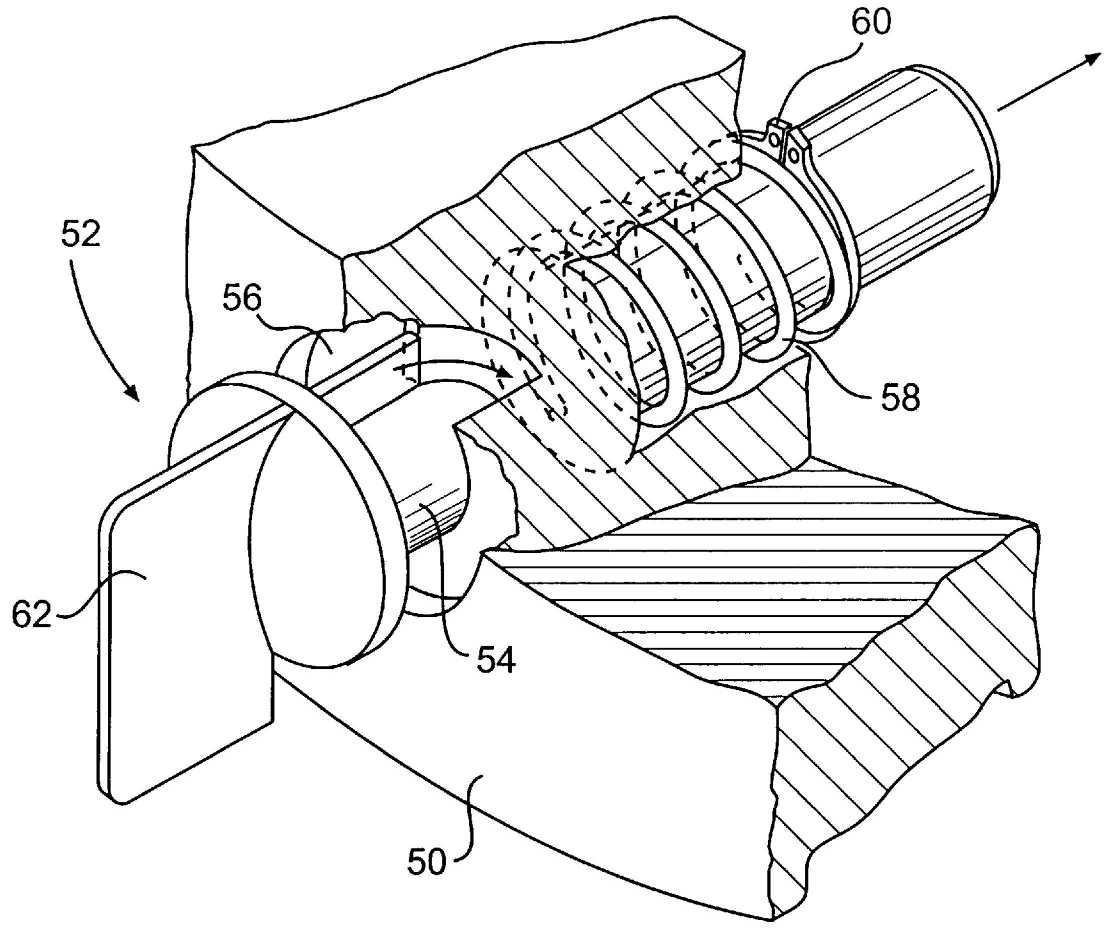
FIG. 5 is an enlarged partial cut-away view of the movable engagement member according to the invention.

In an actuation mode of the device, ring member 50 is operably engaged with engagement surface 36 so that rotation of ring member 50 drives chuck device axially up and down over the axial length of engagement surface 36. In one preferred embodiment illustrated in the figures, an engagement member, generally 52, is provided to operably connect or engage ring member 50 with engagement surface 36 in the actuation mode. Engagement member 52 may comprise, for example, a pin 54 that is movable through a bore 56 defined through ring member 50, as particularly illustrated in FIG. 5. Pin 54 is movable radially with respect to chuck 12 so as to move into and out of engagement with engagement surface 36. Referring to FIG. 2, pin 54 on the left hand side is shown in full lines in the non-engaged position. The operator simply grasps pin 54, for example by means of tab 62, and pushes pin 54 radially towards chuck 12 causing the radially inward end of pin 54 to engage within helical grooves 40, as seen in FIG. 2, or within threads 38, as seen in FIG. 3. Pin 54 is then locked in position by turning the pin a quarter turn. Preferably, pin 54 is spring loaded, as seen in FIG. 5. A spring 58 retained by a clip 60 is disposed to bias pin 54 radially outward.

It should be appreciated that any manner of engagement member or pin device can be utilized to operably connect or engage ring member 50 with engagement surface 36, and that the lockable pin illustrated in the figures is but one example of a suitable device. The only requirement of the engagement member 52 is that it mechanically connect ring 50 with engagement surface 36 so that rotational movement of ring member 50 drives chuck 12 axially. The engagement member must also be movable between an engaged and non-engaged position so that in the non-engaged or non-actuation mode, the chuck 12 is completely disengaged from the actuation member and is free to rotate.

Axially extending helical grooves 40 which are disposed adjacent to each other around the surface of the circumference of sleeve 37, constitute an engagement surface. Pin 54 can be moved into engagement with the engagement surface 36 anywhere along the circumference thereof. An embodiment wherein engaging surface 36 is defined as a threaded surface 38, as illustrated in FIG. 3, is also particularly useful in that a mechanical advantage can be generated between rotation of ring member 50 depending on the thread pitch of the threads of threaded surface 38.

Figure 4:
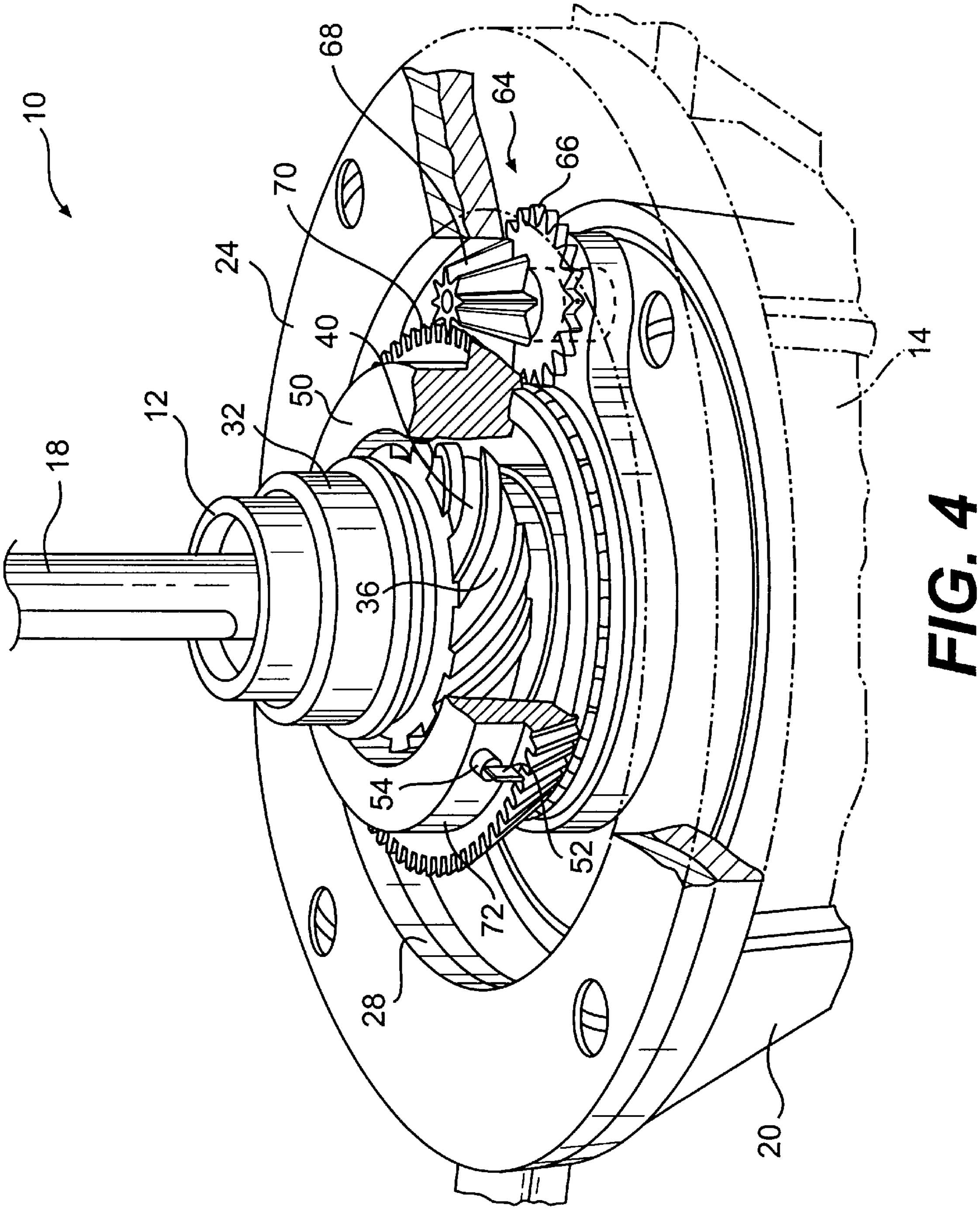
FIG. 4 is an enlarged partial cut-away view of still a third embodiment of the remote chuck actuation device according to the invention.

An alternative preferred embodiment is illustrated in FIG. 4. In this embodiment, engagement surface 36 is defined as helical grooves 40, as discussed above. However, in this embodiment, ring member 50 includes a gear surface 70 defined on at least a portion of its outer circumference. This gear surface 70 is geared to an external drive mechanism 64. Drive mechanism 64 may be, for example, a thumb wheel device 66 rotationally mounted on upper surface 30 of casing 14 and having gear teeth 68 engaged with gear surface 70. The engagement member 52, such as pin 54, is engaged through a planar surface 72 defined on ring member 50 so as not to interfere with the geared engagement between drive mechanism 64 and ring member 50. This embodiment is relatively simple to operate in that the operator simply manually rotates thumb wheel 66 in order to rotate ring member 50 causing chuck 12 to be driven axially between the gripping and release positions. It should be appreciated that drive mechanism 64 can have any configuration. For example, although not illustrated in the figures, drive mechanism 64 may comprise a rotatable handle or lever that extends longitudinally along power tool 10. However, if this embodiment were utilized, rotatable base 20 would need to be configured to accommodate the longitudinally extending member. The embodiment illustrated in FIG. 4 is particularly useful in that the entire drive mechanism 64 is contained within the inner circumference 28 of base member 20. In this manner, base member 20 is free to rotate without concern of interference with the chuck actuation device. This is true also for the embodiments of FIGS. 1 through 3.

Although not illustrated in the figures, it should be appreciated that the chuck actuation device is just as applicable for conventional plunge-style routers. In fact, with the plunge-style routers, the concern of mounting all of the components within the inner circumference 28 of base 20 is not a concern. Thus, with embodiments of the invention utilized on such plunge-style routers, an external drive mechanism 64 may extend longitudinally along casing 14 so that the operator can actuate chuck 12 from a position even more remote from the chuck.

It should be appreciated by those skilled in the art that various modifications and variations can be made in the present invention without departing from the scope or spirit of the invention. It is intended that the present invention include such modifications and variations as come within the scope of the appended claims and their equivalents.

What is claimed is:

1. A rotary power tool having a chuck device, said power tool comprising:

a casing housing a rotationally driven drive spindle;

a chuck device attached to an end of said drive spindle, said chuck device axially movable between a gripping position wherein said chuck device clamps upon a tool held therein, and a release position wherein said chuck device releases a tool held therein;

an engagement surface on an outer circumference of said chuck device over a defined axial length thereof;

an actuator member disposed around and rotatable relative to said engagement surface; and wherein in an actuation mode said actuator member is operably engageable with said engagement surface such that rotation of said actuator member drives said chuck device axially between said gripping and release positions, and in a non-actuation mode said actuator member is disengaged from said engagement surface.

2. The rotary power tool as in claim 1, wherein said engagement surface comprises a grooved surface, and said actuator member further comprises an engagement member moveable into grooves of said grooved surface in said actuation mode and moveable out of said grooves in said non-actuation mode.

3. The rotary power tool as in claim 2, wherein said grooved surface comprises one of a threaded surface or helix.

4. The rotary power tool as in claim 1, wherein said actuator member comprises a rotatable ring member.

5. The rotary power tool as in claim 4, further comprising at least one moveable engagement member moveable relative to said ring member into driving engagement with said engagement surface in said actuation mode, and moveable out of engagement with said engagement surface in said non-actuation mode.

6. The rotary power tool as in claim 5, wherein said ring member is manually rotatable.

7. The rotary power tool as in claim 1, further comprising a drive mechanism operably configured with said actuator member to rotate said actuator member in said actuation mode.

8. The rotary power tool as in claim 7, wherein said drive mechanism comprises a manually rotatable member geared to said actuator member.

9. The rotary power tool as in claim 8, further comprising a gear surface defined on an outer circumferential surface of said actuator member.

10. The rotary power tool as in claim 1, wherein said chuck device comprises an axially movable outer sleeve, said engagement surface disposed around said sleeve.

11. The rotary power tool as in claim 10, further comprising a ring member fitted onto said sleeve, said engagement surface defined on said ring member.

12. The rotary power tool as in claim 1, wherein said power tool is a router, and further comprising a base member movable relative to said casing and said chuck device for establishing a working position of said chuck device relative to a work piece.

13. The rotary power tool as in claim 12, wherein said base member is rotatably advanceable on said casing for changing said working position, said actuator member rotatably mounted on said casing generally within an inner circumference of said base member so as not to interfere with rotational movement of said base member relative to said casing.

14. A power router, comprising:

a casing housing a rotationally driven drive spindle;

a chuck device attached to an end of said drive spindle, said chuck device axially movable between a gripping position wherein said chuck device clamps upon a tool held therein, and a release position wherein said chuck device releases a tool held therein;

a base member movable relative to said casing and said chuck device for establishing a working position of said chuck device relative to a work piece;

an engagement surface on an outer circumference of said chuck device over an axial length thereof;

an actuator member disposed around and rotatable relative to said engagement surface; and an engagement member moveable between an engaged position wherein it operably engages with said engagement surface such that rotation of said actuator member drives said chuck device axially between said gripping and release positions, and a non-engaged position wherein it is moved out of engagement with said engagement surface.

15. The router as in claim 14, wherein said chuck device comprises an axially movable outer sleeve, said engagement surface disposed on said sleeve member.

16. The router as in claim 15, wherein said engagement surface comprises a grooved surface, and said engagement member comprises a pin member movable radially into and out of said grooves.

17. The router as in claim 14, wherein said actuator member comprises a manually rotatable ring member.

18. The router as in claim 14, further comprising a drive mechanism configured with said actuator member.

19. The router as in claim 18, wherein said drive mechanism comprises a rotatable member coupled to said actuator member.

20. The router as in claim 14, wherein said base member is rotatably advanceable on said casing for changing said working position, said actuator member rotatably mounted on said casing within an inner circumference of said base member so as not to interfere with rotational movement of said base member relative to said casing.

* * * * *